US012759215B2

(12) United States Patent
Waldleitner et al.

(10) Patent No.: US 12,759,215 B2
(45) Date of Patent: Oct. 13, 2026

(54) MULTIPART GRIPPER UNIT AS WELL AS STRETCHING UNIT

(71) Applicant: BRÜCKNER MASCHINENBAU GmbH, Siegsdorf (DE)

(72) Inventors: Georg Waldleitner, Bad Endorf (DE); Thomas Rott, Siegsdorf (DE); Rudolf Jauernig, Taching (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 252 days.

(21) Appl. No.: 17/861,038

(22) Filed: Jul. 8, 2022

(65) Prior Publication Data

US 2023/0008385 A1 Jan. 12, 2023

(30) Foreign Application Priority Data

Jul. 9, 2021 (DE) .................... 10 2021 117 782.0

(51) Int. Cl.
*B29C 55/20* (2006.01)

(52) U.S. Cl.
CPC .................................. *B29C 55/20* (2013.01)

(58) Field of Classification Search
CPC ......... B29C 55/20; B29C 55/04; B29C 55/08; B29C 55/16
See application file for complete search history.

(56) References Cited

U.S. PATENT DOCUMENTS

| | | | | |
|---|---|---|---|---|
| 9,073,257 | B2 * | 7/2015 | Sano | B29C 55/08 |
| 2016/0185032 | A1 * | 6/2016 | Eckart | B29C 55/20 425/403.1 |
| 2021/0108347 | A1 | 4/2021 | Bauer et al. | |

FOREIGN PATENT DOCUMENTS

| | | | |
|---|---|---|---|
| CN | 203019679 | | 6/2013 |
| CN | 203557704 | U | 4/2014 |
| CN | 209616330 | U | 11/2019 |
| DE | 10 2012 025 486 | A1 | 6/2014 |
| EP | 0 760 740 | | 3/1997 |
| GB | 0971040 | * | 9/1964 |
| GB | 2 148 961 | | 6/1985 |
| JP | 60-102292 | U | 7/1985 |
| JP | 06-23838 | A | 2/1994 |
| JP | 2015-208860 | A | 11/2015 |
| KR | 10-2016-0071418 | A | 6/2016 |
| WO | 2012168566 | A1 | 12/2012 |
| WO | 2015055272 | A1 | 4/2015 |

(Continued)

OTHER PUBLICATIONS

Liu (English Translation of CN203557704U) (Year: 2013).*

(Continued)

*Primary Examiner* — Michael A Tolin
*Assistant Examiner* — Hana C Page
(74) *Attorney, Agent, or Firm* — Nixon & Vanderhye, PC

(57) ABSTRACT

A multipart gripper unit for a transverse, longitudinal and/or simultaneous stretching unit is disclosed having a main part and at least two guide parts. The main part includes a base body as well as a clamping device for clamping a material web and the guide parts each comprise a base body as well as at least one guide element for guidance on a rail of the stretching unit. The base bodies of the guide parts and the base body of the main part are each manufactured as separate component parts and attached to each other.

16 Claims, 5 Drawing Sheets

(56) References Cited

FOREIGN PATENT DOCUMENTS

| | | | | |
|---|---|---|---|---|
| WO | 2020/077993 | | 4/2020 | |
| WO | WO-2020077993 A1 | * | 4/2020 | ............ B29C 55/08 |

OTHER PUBLICATIONS

Zhou (Machine translation of CN209616330U) (Year: 2019).*

Japanese Office Action and English Translation for Application No. JP 2022-109403, seven pages, dated Oct. 3, 2023.

Official Communication for Application No. EP 22183283.5, 12 pages, dated Feb. 1, 2023.

Examination Report with English translation for IN 202224039242, eight pages, dated Oct. 14, 2025.

Notice of Office Action with English Translation for Application No. KR10-2022-0083724, 59 pages, dated May 27, 2025.

* cited by examiner

MULTIPART GRIPPER UNIT AS WELL AS STRETCHING UNIT

CROSS RELATED APPLICATION

This application claims priority to German Patent Application DE 10 2021 117 782.0,filed Jul. 9, 2021, the entire contents of which is hereby incorporated by reference.

FIELD OF THE DISCLOSURE

The disclosure relates to a multipart gripper unit as well as a stretching unit comprising a multipart gripper unit.

BACKGROUND

Stretching units are used in particular in the production of plastics films. Normally, the material web to be stretched, in general a plastics film, is gripped in such units by means of gripper units or grippers and moved through the unit. The gripper units are displaceably arranged on encircling guide rails and driven centrally or independently.

During the actual stretching process, large forces act on the grippers so that these are subject to extremely high loads. Thus, special load requirements are placed on the gripper units.

The manufacture of gripper units is thus very expensive as the gripper units are usually manufactured by means of casting processes, such as precision casting, sand casting or Croning casting. In addition, the gripper units have a comparatively complex and interlaced geometry comprising large cavities and empty spaces. As a result, a dense arrangement on a casting tree is not possible and finishing steps, for example galvanizing individual component parts, are more difficult and cost intensive.

SUMMARY

Thus, there is provided a gripper unit as well as a stretching unit comprising gripper units which can be manufactured more simply and economically, however, at the same time satisfy the high requirements for stretching units.

It is provided a multipart gripper unit for a stretching unit, in particular a transverse, longitudinal and/or simultaneous stretching unit, comprising a main part and at least two guide parts. The main part comprises a base body as well as a clamping device for clamping a material web and the guide parts each comprise a base body as well as at least one guide element for guiding onto a rail of the stretching unit, wherein the base bodies of the guide parts and the base body of the main part are each manufactured as separate component parts and are attached to each other.

As the gripper unit is multipartite comprising a main part and two guide parts, smaller individual units are created, thereby considerably reducing the complexity of the individual component parts. As a result, for example in castings processes, component part positioning on the casting tree can be more closely spaced thus with a denser configuration.

In addition, the cost of further treatment steps is reduced as, for example in galvanizing, the costs are dependent on the size of the surface area.

The inventors have identified that one at least three-part gripper unit can comply with all requirements with regard to load limits that are placed on the gripper units for stretching units, although the gripper unit is divided into a main part and at least one separate guide part.

In doing so, sections of the base body of the main part can form sections of the clamping device.

In particular, the clamping device comprises at least one blade flap that is pivotally mounted on the base body of the main part.

For example, the base bodies of the guide parts and/or the base body of the main part are made of metal and/or manufactured by means of primary forming. In this way, load properties of the gripper unit can be improved further.

For example, the base bodies of the guide parts and the base body of the main part are cast or forged as separate component parts.

The gripper unit can comprise a primary direction, in particular wherein the base bodies of the guide parts extend parallel to the primary direction in order to carry loads effectively.

For example, the primary direction is that direction, in particular the horizontal direction, which runs transversely to an edge of a material web received by the gripper unit, more specifically the clamping device.

In an embodiment of the disclosure, the mounting surface between the base body of one of the guide parts and the base body of said main part runs perpendicular to the primary direction, thereby achieving a particularly robust attachment.

In particular, the vast majority of the mounting surface extends perpendicularly to the primary direction.

The base bodies of the guide parts can be attached to the main part by means of threaded fasteners of the gripper unit for a simple and robust attachment of the base body.

The threaded fasteners may be screws or bolts.

The threaded fasteners are designed, for example, to be capable of supporting a maximum force of between 700 N and 900 N, in particular 800 N. It is also conceivable that the threaded fasteners can support greater forces.

The threaded fasteners can also be fit bolts.

In an embodiment, the gripper unit has a U-shape with a base and two arms, in particular wherein the base body of the main part forms the base and the base bodies of the guide parts each form one of the arms. Using a U-shape results in a particularly stable gripper unit.

The U-shape exists in particular in side view and/or in cross section.

The base can extend perpendicularly to the primary direction and/or the arms can extend parallel to the primary direction.

The guide parts run in particular parallel to each other.

The main part can comprise a material side and a guide side, wherein the clamping device is provided on the material side and/or the guide parts are attached on the main part on the guide side. In this way, the functions of the gripper unit can be separated clearly.

The sides are understood to mean the sides in the primary direction.

In an embodiment, the gripper unit comprises a receiving space that is limited at least by the guide parts, wherein the mounting surface of the base body is located between the clamping device and the receiving space, thus greatly reducing empty volumes when primary forming.

Within the scope of the disclosure, the mounting surface of the base body is understood to mean the mounting surface between the base body of one of the guide parts and the base body of said at least one main part.

The mounting surface is in particular between the clamping device and the receiving space in the primary direction.

For further geometrical simplification, the receiving space can be located in front of the guide side of the main part and/or the main part and the guide parts can define the receiving space.

In an embodiment, at least one attachment element is formed in each case for attaching the guide element and/or a drive element to the base bodies of the guide parts, in particular, said at least one attachment element can adjoin the receiving space and/or extend into the receiving space, thus making it possible to simplify the assembly of the gripper unit.

To ensure reliable and secure guidance of the gripper unit on the rail, the guide element can be a roller, a slide element and/or a magnetic element, and/or wherein the drive element can be a chain, part of a chain, part of a linear motor and/or an engagement projection for a belt of a drive system of the stretching unit.

The magnetic element is, for example, a permanent magnet or a ferromagnetic counterpart for a magnet.

The object is also solved by means of a stretching unit, in particular a transverse, longitudinal and/or simultaneous stretching unit comprising a rail and at least one multipart gripper unit as previously described, wherein the gripper unit is guided on the rail by means of the guide element.

The features and advantages described for the gripper unit apply equally to the stretching unit and vice versa.

BRIEF DESCRIPTION OF THE DRAWINGS

Additional features and advantages of the disclosure are found in the following description as well as the attached drawings to which reference is made. In the drawings.

DETAILED DESCRIPTION

Figure 1:
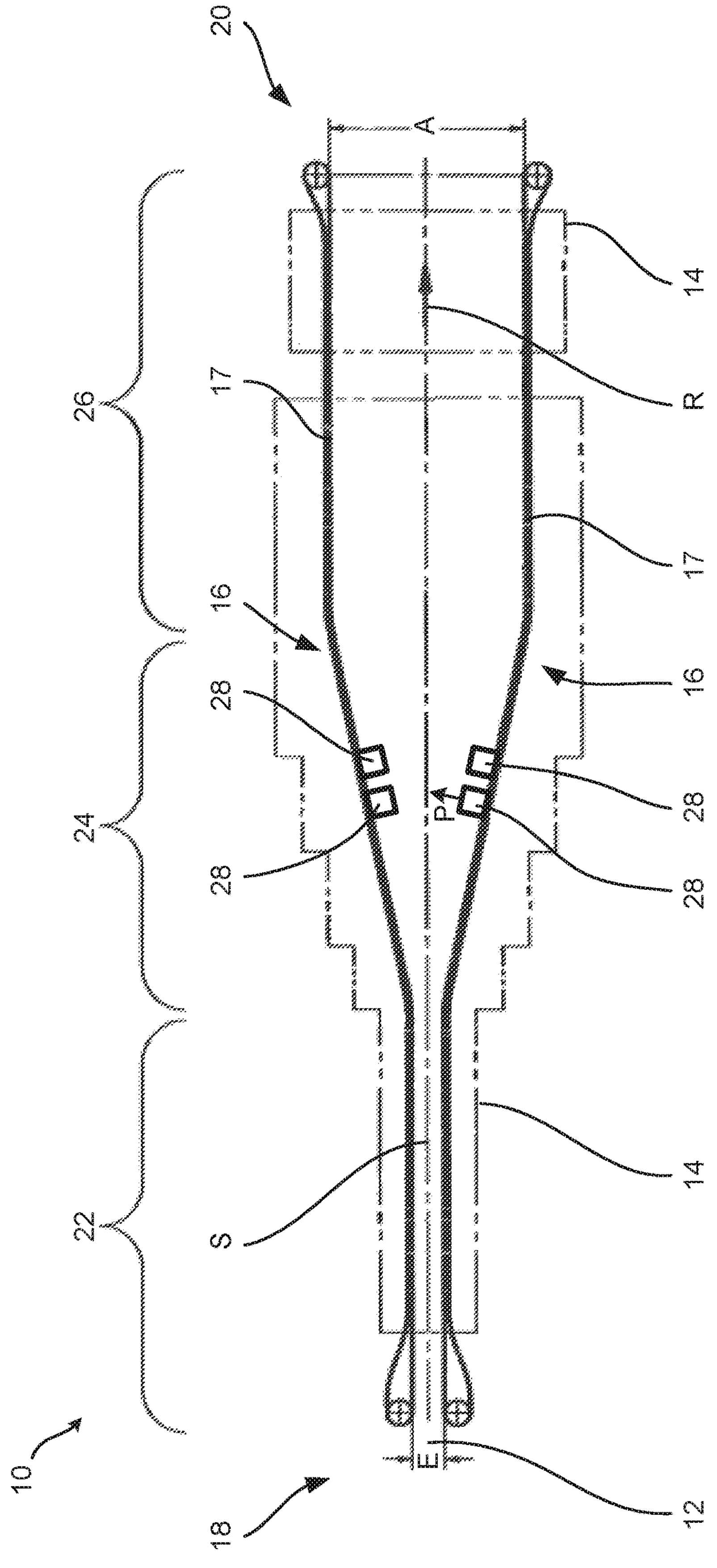
FIG. 1 shows a schematic view of a first embodiment of a stretching unit according to the disclosure.

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than three items.

The stretching unit 10 comprises an oven 14 as well as two drive systems 16.

The drive systems 16 are located mirror-symmetrically with respect to a symmetry axis S of the stretching unit 10 and extend at least partly into the oven 14. In an entry zone 18 as well as an exit zone 20, in which the material web 12 of the stretching unit 10 is fed or removed, the drive systems 16 run outside of the oven 14.

In addition to the entry zone 18 and the exit zone 20, the stretching unit has at least three further zones 22, 24, 26.

The zones 22, 24, 26 adjoin each other so that, as seen along the usual direction of travel and drawing direction R of the stretching unit 10, the entry zone 18 adjoins the first zone 22 which in turn adjoins the second zone 24 which in turn adjoins the third zone 26 and which in turn finally adjoins the exit zone 20.

The drive systems 16 have a first spacing from each other in the first zone 22 of the stretching unit 10 that adjoins the entry zone 18, said first zone 22 also being termed the preheating zone.

In the second zone 24, also termed the stretching zone, the spacing of both drive systems 16 to each other increases until finally at the start of the third zone 26, also termed the heat treatment zone, a second spacing is reached.

Each of the drive systems 16 has a rail 17 in the known manner, on said rail 17 a multitude of gripper units 28 are guided. The gripper units 28 can be moved along the rail 17 by means of a drive of the respective drive system 16.

Figure 2:
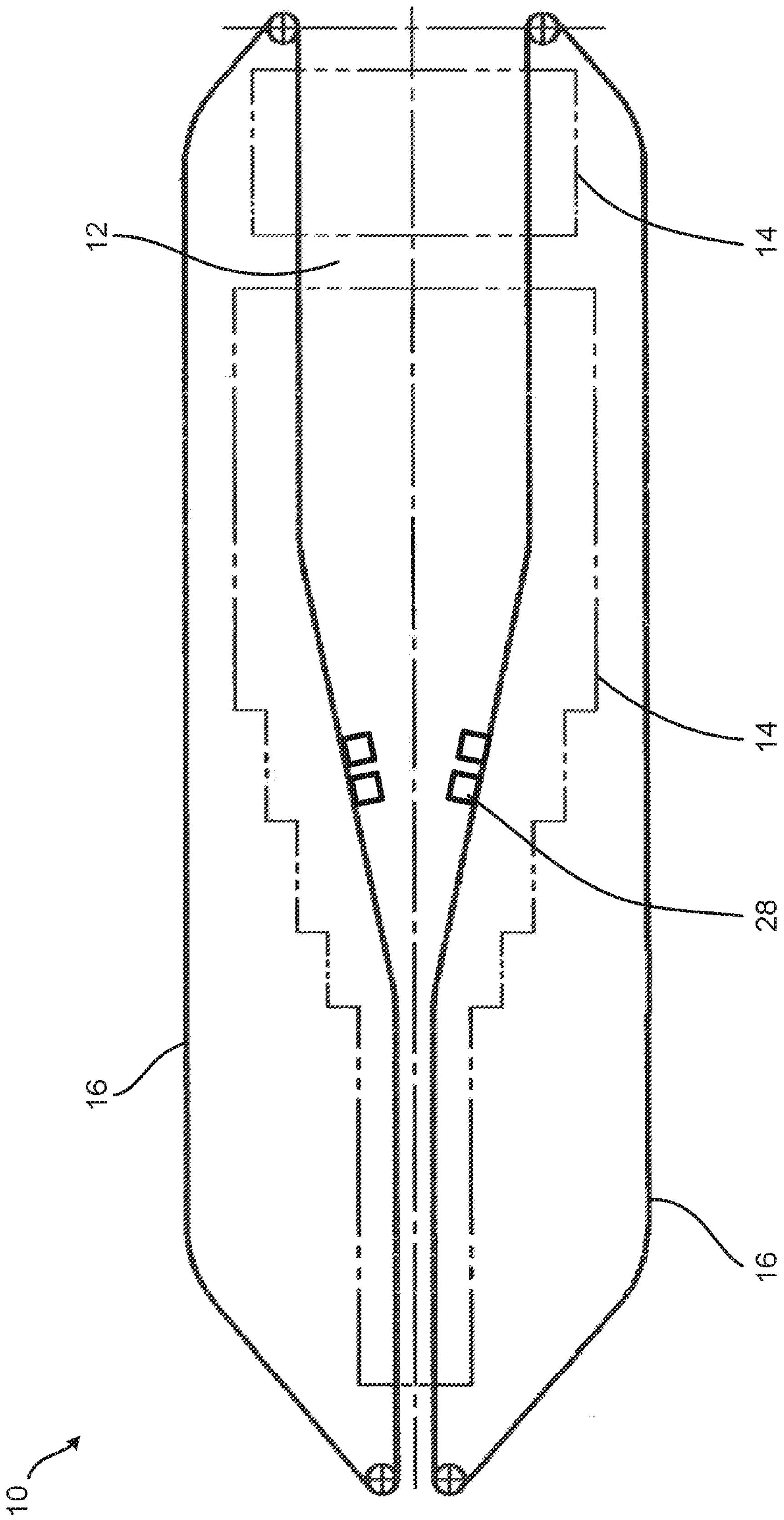
FIG. 2 shows a schematic view of a second embodiment of a stretching unit according to the disclosure.

In FIGS. 1 and 2, only two gripper units 28 per drive system 16 are shown in each case symbolically. However, the stretching unit 10 comprises more gripper units 28.

The rails 17 of the respective drive systems 16 circle a closed path from the entry zone 18 to the exit zone 20 and back again. The rail section forming the forward travel extends between the entry zone 18 and the exit zone 20 within the oven 14 in the intended direction of travel of the gripper units 28.

The rail section that runs from the exit zone 20 to the entry zone 18 in the normal operating direction and forms the return is also located within the oven 14 in the shown embodiment. As shown in the embodiment according to FIG. 2, it can however be located outside the oven 14.

To operate the stretching unit 10, the material web 12 to be stretched is fed into the entry zone 18 of the stretching unit 10 in the drawing direction R. To this end, the material web 12 is fixed to both drive systems 16 by means of its edges running in the drawing direction R.

More specifically, the edges of the material web 12 are fixed by a clamping device 30 (FIG. 3) of the gripper units 28 and thus moved along the rails 17 of the drive systems 16 by the movement of the gripper units 28.

In the entry zone 18, the material web 12 has a width E perpendicular to the drawing direction R that approximately corresponds to the first spacing between the drive systems 16.

The material web 12 is then fed through the first zone 22 and heated there. In the following second zone 24, thus the stretching zone, the material web 12 is stretched as the spacing of the drive systems 16 is increased continuously. At the end of the second zone 24, the material web has a second width A.

After completing the stretching, the material web 12 passes through the third zone 26, in which a relaxation of the material web 12 can take place before the material web 12 is detached from the gripper units 28 in the exit zone 20 and leaves the stretching unit 10 with a width A.

For example, the stretching unit 10 is the film-spreading stretching unit or transverse direction orienter, also referred to in short as a TDO (TDO=transverse direction oven).

It is also conceivable that the stretching unit 10 is a simultaneous stretching unit, in which the material web 12 can be stretched in the second zone 24, thus the stretching zone, not only in the direction transverse to the drawing direction R but also in the drawing direction R.

During the processing of the material web 12, large tensile forces act on the gripper units 28 in a tensile direction especially in the second zone 24, thus the stretching zone. The tensile direction is predominantly in a primary direction P of the gripper units 28 and is to a lesser extent transverse to the primary direction P.

The gripper units 28 must thus be formed to withstand large tensile forces, in particular in the primary direction P.

The primary direction P is here that horizontal direction that runs transversely to an edge of the material web 12 received in the gripper unit 28.

Figure 3:
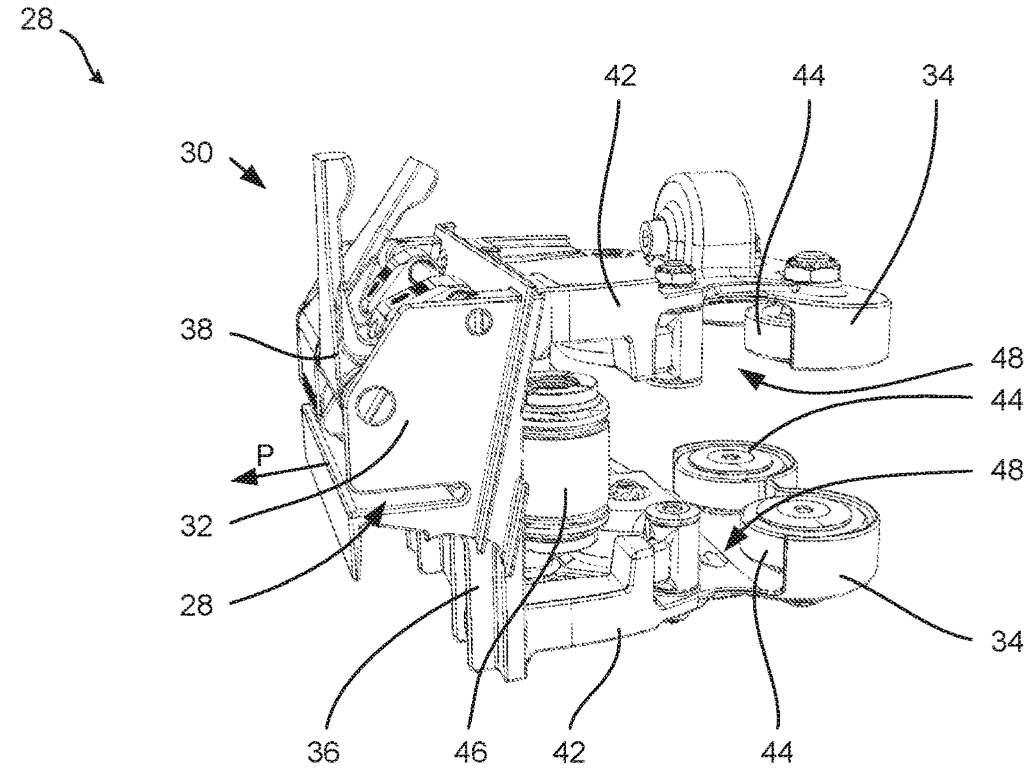
FIGS. 3 and 4 show a perspective view and side view of a first embodiment of a gripper unit according to the disclosure, FIG. 5. shows a separate base body of the gripper unit according to FIG. 3.
Figure 4:
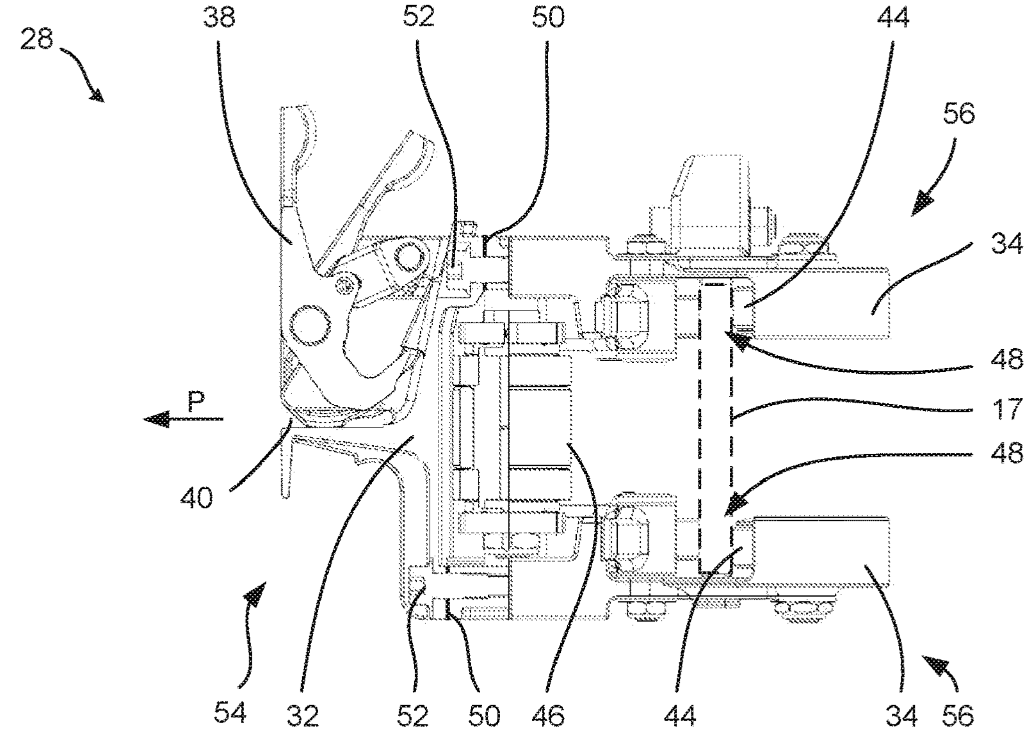

In FIGS. 3 and 4, one of the gripper units 28 is shown exemplarily in a perspective view and partially in section in a side view.

The gripper unit 28 comprises a main part 32 as well as two guide parts 34, wherein the main part 32 and the guide parts 34 are formed in primary forming processes as components separate from each other and subsequently attached to each other. The gripper unit is therefore multipartite.

The main part 32 has a base body 36 and comprises the clamping device 30.

The side of the base body 36, on which the clamping device 30 is provided, is also referred to as the material side. The other side, i.e. the side of the base body 36 without the clamping device 30, is referred to as the guide side as the guide parts 34 are attached on this side.

Accordingly, the main part 32 also comprises a material side and a guide side.

In the shown embodiment, the clamping device 30 is formed in the known manner from sections of the base body 36 and the blade flap 38 pivotally mounted on the base body 36.

The clamping device 30 defines a fixing section 40 or a fixing opening, into which the edge of the material web 12 to be fixed can be fed and fixed to the gripper unit 28 by means of the blade flap 38.

The primary direction P of the gripper unit 28 is perpendicular to the edge and the edge of the material web 12 that is fixed in the gripper unit 28. The primary direction P runs, for example, in FIG. 4 to the left.

The base body 36 is, for example, galvanized or nickel plated in the area of the fixing section 40.

A fixed material web 12 exerts a tensile force in the tensile direction on the gripper unit 28 in the second zone 24 (stretching zone).

The guide parts 34 each comprise a base body 42 as well as each at least one guide element 44 that is attached to the base body 42.

In the first embodiment, the guide parts 34 also comprise a drive element 46 that, for example, is a chain or part of a chain of the drive system 16.

The drive element 46 can also be an engagement projection for a belt of the drive system 16 or part of a linear motor.

In the shown embodiment, the guide elements 44 are formed as rollers. In other embodiments, however, the guide elements 44 can also be slide elements and/or magnetic elements, such as a permanent magnet or a ferromagnetic counterpart.

The guide parts 34 define a receiving space 48 for the rail 17 (also termed guide rail). In particular, a recess can be provided in each of the base bodies 42 of the guide parts 34, in said recess the rail 17 is received.

The receiving space 48 is located accordingly in front of or on the guide side of the main part 32.

The guide elements 44, in particular rollers and if applicable sliding elements, can project into the receiving space 48 and rest on the rail 17 and serve as a guide on the rail.

Figure 5:
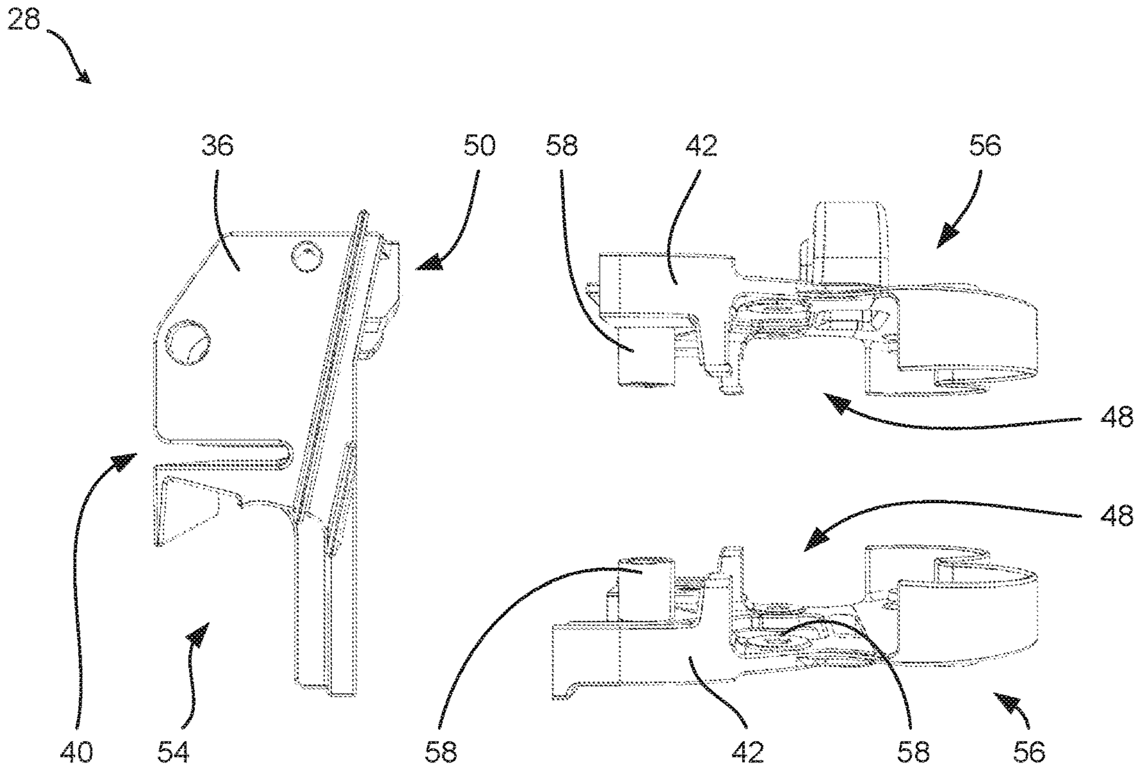

In FIG. 5, the base bodies 36, 42 of the main part 32 or the guide parts 34 are shown separately and individually, for example as they are directly after their manufacture, e.g. primary forming.

Figure 6:
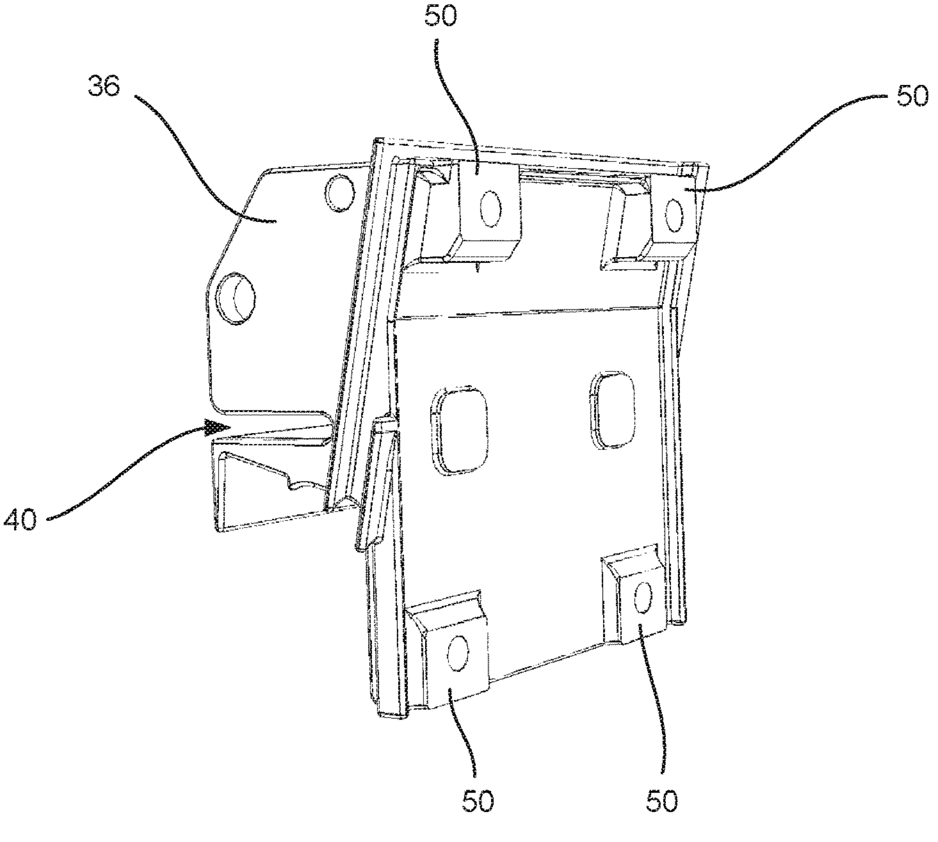
FIG. 6 shows the base body of the main part of the gripper unit according to FIG. 4 in a perspective view.

In FIG. 6, only the base body 36 of the main part 32 is shown as viewed from the guide side.

The base bodies 36, 42 are made of metal, for example G26CrMo4 or G42CrMo4, and manufactured using a casting process, a forging process or formed as a machining part.

The base bodies 42 of the guide parts 34 also have attachment elements 58, such as projections, recesses and/or depressions, to which the guide elements 44 and/or drive elements 46 can be attached.

The attachment elements 58 can be adjacent to the receiving space 48 here or extend into the receiving space 48.

The base bodies 42 of the guide parts 34 and the base body 36 of the main part 32 rest on the mounting surfaces 50 on each other and are attached to each other by means of threaded fasteners 52, for example fit bolts, of the gripper unit 28.

The threaded fasteners 52 are designed, for example, to be capable of supporting a maximum force of between 700 N and 900 N, in particular 800 N. It is also conceivable that the threaded fasteners can support greater forces.

As can be seen in FIG. 4, the threaded fasteners 52 extend (roughly) parallel to the primary direction P. The mounting surfaces 50 extend perpendicular to the primary direction P, as can be seen for example in FIG. 6 on the base body 36 of the main part 32.

The mounting surfaces 50 are thus located along the primary direction P between the clamping device 30 and the receiving space 48.

The base bodies 42 of the guide parts 34 are thus provided on the guide side of the main part 32 and extend from the base body 36 of the main part 32 parallel to the primary direction P. The guide parts 34 and their base bodies 42 thus run parallel to each other.

The base bodies 36, 42 of the main part 32 and the guide parts 34 form together a U-shape (in a side view and/or a cross section through the gripper unit 28) so that the gripper unit 28 has a U-shape.

The U-shape has a base 54 as well as two arms 56, wherein in the shown embodiment the base 54 is formed by the base body 36 of the guide parts 34 and the arms are each formed by one of the base bodies 42 of the guide parts 34.

The base 54 extends perpendicular to the arms 56. The arms 56 extend in turn parallel to the primary direction P.

As the base bodies 36, 42 each comprise compacter and considerably less complex geometries in comparison to the entire gripper unit 28 (the base bodies 42 of the guide parts 34 can be regarded in the broadest sense as plate-like), more base bodies 36, 42 can be provided on a casting tree, thereby considerably reducing production costs, i.e. compared to single-part gripper units and, if applicable, two-part gripper units. In addition, the effort required to cast three base bodies is considerably lower as the geometries can be formed more simply.

Through the separate construction of the base bodies 36, 42, the manufacture of the base bodies 36, 42 is simplified greatly. Also further required process steps, such as galvanizing the base body 36 in the area of the fixing section 40 can be executed more simply and thus more economically.

Figure 7:
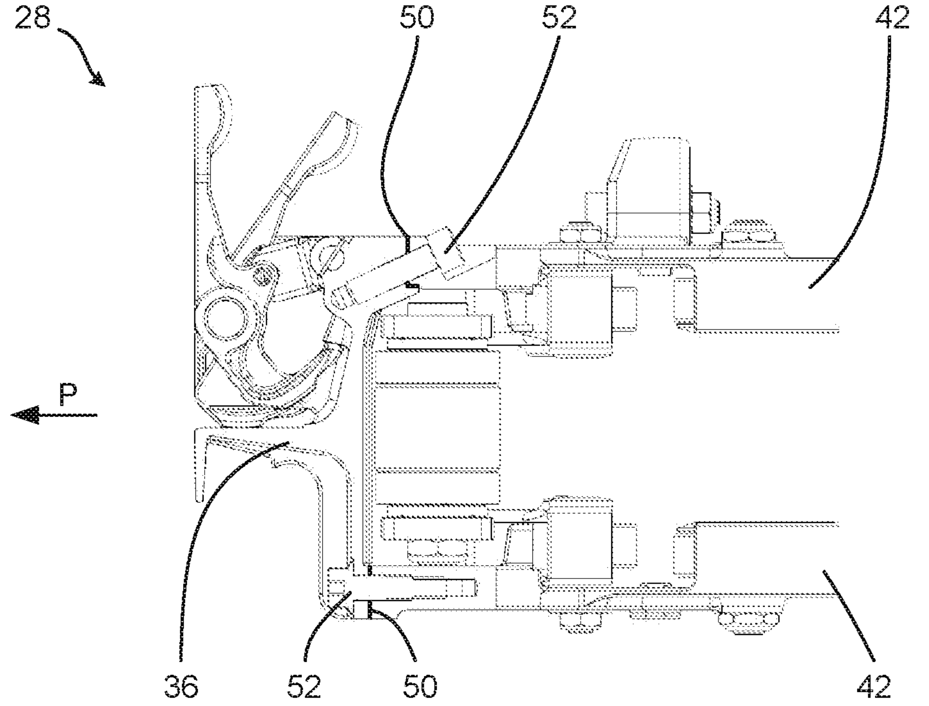
FIG. 7 shows a side view of a second embodiment of a gripper unit according to the disclosure.

In FIG. 7, a further embodiment of the disclosure is shown. The further embodiment corresponds substantially to the embodiment of the gripper unit 28 described previously so that only the differences are discussed hereinafter.

Identical and functionally equivalent parts are provided with the same reference signs.

In FIG. 7, a multipart gripper unit 28 is shown according to a second embodiment in a partial sectional view similar to that of FIG. 4.

In contrast to the first embodiment, the threaded fasteners 52 for attaching the base body 42 of one of the guide parts 34 to the main part 32 do not run parallel to the primary direction P, but rather obliquely to it.

Moreover, the mounting surface 50 (marked in bold in FIG. 7) is not solely perpendicular to the primary direction P, but has a section parallel to the primary direction P. As a result, the assembly is simplified, but the stability of the gripper unit is also increased.

The vast majority of the mounting surface 50 runs however perpendicular to the primary direction P.

The invention claimed is:

1. A multipart gripper unit for a stretching unit, comprising:

a main part and at least two guide parts, wherein the main part comprises a base body as well as a clamping device for clamping a material web and the guide parts each comprise a base body as well as at least one guide element for guidance on a rail of the stretching unit, wherein the base bodies of each of the at least two guide parts and the base body of the main part are each manufactured as separate component parts and attached to each other, wherein the base bodies of the main part and the guide parts form together a U-shape, wherein the U-shape has a base and two arms, wherein the base is formed by the base body of the guide parts, wherein the arms are each formed by one of the base bodies of the guide parts; and, wherein each of the base bodies of the guide parts is fixed to the main part by means of at least one screw of the gripper unit, the at least one screw extending in the base of the U-shape and in the respective arm of the U-shape.

2. The multipart gripper unit according to claim 1, wherein the base bodies of at least one of the guide parts and the base body of the main part are made of at least one of metal and manufactured using a casting process.

3. The multipart gripper unit according to claim 1, wherein the gripper unit has a primary direction (P).

4. The multipart gripper unit according to claim 3, wherein the base bodies of the guide parts extend parallel to the primary direction (P).

5. The multipart gripper unit according to claim 3, wherein a mounting surface between the base body of one of said guide parts and the base body of the main part runs perpendicular to the primary direction (P).

6. The multipart gripper unit according to claim 1, wherein each of the at least one screw run parallel to the primary direction (P).

7. The multipart gripper unit according to claim 1, wherein the main part comprises a material side and a guide side, wherein the clamping device is provided on the material side and the guide parts are attached on the main part on the guide side.

8. The multipart gripper unit according to claim 1, wherein the gripper unit comprises a receiving space that is limited at least by the guide parts, wherein a mounting surface of the base bodies is located between the clamping device and the receiving space.

9. The multipart gripper unit according to claim 8, wherein the receiving space is located in front of a guide side of the main part.

10. The multipart gripper unit according to claim 8, wherein the main part and the guide parts define the receiving space.

11. The multipart gripper unit according to claim 1, wherein at least one attachment element is formed at each of the base bodies of the guide parts for attaching at least one of the guide element and a drive element.

12. The multipart gripper unit according to claim 11, wherein said at least one attachment element at least one of adjoins the receiving space and extends into the receiving space.

13. The multipart gripper unit according to claim 1, wherein the at least one guide element is at least one of a roller, a slide element and a magnetic element.

14. The multipart gripper unit according to claim 11, wherein the drive element is at least one of a chain, part of a chain, a part of a linear motor and an engagement projection for a belt of a drive system of the stretching unit.

15. A stretching unit comprising a rail and at least one multipart gripper unit, the at least one multipart gripper unit comprising a main part and at least two guide parts, wherein the main part comprises a base body as well as a clamping device for clamping a material web and the guide parts each comprise a base body as well as at least one guide element for guidance on a rail of the stretching unit, and wherein the base bodies of each of the at least two guide parts and the base body of the main part are each manufactured as separate component parts and attached to each other, wherein the at least one multipart gripper unit is guided on the rail by means of the guide element, wherein the base bodies of the main part and the guide parts form together a U-shape, wherein the U-shape has a base and two arms, wherein the base is formed by the base body of the guide parts, wherein the arms are each formed by one of the base bodies of the guide parts, and wherein each of the base bodies of the guide parts is fixed to the main part by means of at least one screw of the gripper unit, the at least one screw extending in the base of the U-shape and in the respective arm of the U-shape.

16. The stretching unit according to claim 15, wherein the stretching unit is at least one of a transverse, longitudinal and simultaneous stretching unit.

* * * * *